(12) United States Patent
Park et al.

(10) Patent No.: US 6,839,117 B1
(45) Date of Patent: Jan. 4, 2005

(54) COMPENSATING ELECTRODE STRUCTURE OF A DISPLAY DEVICE

(75) Inventors: Han Jun Park, Chubei (TW); Seob Shin, Taoyuan (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 10/798,569

(22) Filed: Mar. 12, 2004

(30) Foreign Application Priority Data

Dec. 11, 2003 (TW) ........................................ 92134986 A

(51) Int. Cl.[7] .............................................. G02F 1/13
(52) U.S. Cl. ...................................................... 349/141
(58) Field of Search ................................ 349/141, 143, 349/129

(56) References Cited

U.S. PATENT DOCUMENTS 6,297,866 B1 * 10/2001 Seo et al. .................... 349/141
6,474,712 B1 * 11/2002 Govzman et al. ........... 294/106
6,611,310 B2 * 8/2003 Kurahashi et al. .......... 349/141
2002/0039164 A1 * 4/2002 Song .......................... 349/141
2003/0071952 A1 * 4/2003 Yoshida et al. ............. 349/141
2003/0133063 A1 * 7/2003 Kwok et al. ................ 349/113

* cited by examiner

*Primary Examiner*—James A. Dudek
(74) *Attorney, Agent, or Firm*—Rabin & Berdo, P.C.

(57) ABSTRACT

The present invention provides a display panel with compensating electrodes, having pixels comprising a plurality of the first electrodes and the second electrodes, and an insulating layer between the first electrodes and the second electrodes. Each pixel can be divided into the first sub-pixel including the first domain and the second domain, the second sub-pixel near the first sub-pixel and including the third domain and the fourth domain, and the third sub-pixel near the second sub-pixel and including the fifth domain and the sixth domain. The first electrodes are parallel to the second electrodes in each domain. The first electrodes are under the second electrodes in the first domain, the fourth domain and the fifth domain. The first electrodes are above the second electrodes in the second domain, the third domain and the sixth domain. Due to the different position in the neighboring domains, the asymmetrical structure is capable of compensating internal DC.

20 Claims, 9 Drawing Sheets

US 6,839,117 B1

COMPENSATING ELECTRODE STRUCTURE OF A DISPLAY DEVICE

BACKGROUND OF THE INVENTION

1. Field of the Invention

The present invention relates in general to an in-plane switching liquid crystal display (IPS-LCD), and in particular to electrode structures of an IPS-LCD.

2. Description of the Related Art

Liquid crystal displays (LCDs) are classified by the orientation of the LC molecules interposed between the glass substrates. In a conventional twisted nematic LCD (TN-LCD), the LC molecules are twisted between the two substrates. In contrast, in an in-plane switching LCD (IPS-LCD), common electrodes and pixel electrodes are formed on a lower glass substrate (TFT substrate) and an in-plane electric field therebetween is generated for rearranging the LC molecules along the electric field. Accordingly, the IPS-LCD has been used or suggested for improving drawbacks of the conventional TN-LCD, such as a very narrow viewing angle and a low contrast ratio.

In order to achieve better performance of the in-plane electric field, a comb-shaped electrode array is built into the IPS-LCD to solve problems such as an insufficient aperture ratio and crosstalk produced between data lines and common electrodes. FIGS. 1A and 1B are sectional diagrams of a conventional IPS-LCD. FIG. 1C is a top view of the electrode structures of a conventional IPS-LCD. FIG. 1A shows the alignment of the LC molecules in an off state, and FIG. 1B shows the alignment of the LC molecules at an on state. The IPS-LCD has a lower glass substrate 10, an upper glass substrate 12, and a liquid crystal layer 14 interposed between the two parallel glass substrates 10 and 12. A plurality of strip-shaped common electrodes 16 arranged as a comb-shape structure is patterned on the lower glass substrate 10 serving as a TFT substrate, an insulating layer 18 is deposited on the common electrodes 16 and the lower glass substrate 10, and a plurality of strip-shaped pixel electrodes 20 arranged as a comb-shape structure is patterned on the insulating layer 18.

As shown in FIG. 1A, before an external voltage is applied to the IPS-LCD, the LC molecules 14A are aligned in a direction parallel to the lower glass substrate 10. As shown in FIG. 1B, when an external voltage is applied to the IPS-LCD, an in-plain electric field 22 is generated between the common electrode 16 and the pixel electrode 20, resulting in rotation of the LC molecules 14B toward the in-plane electric field 22.

Depending on the material and the structural design of the common electrode 16 and the pixel electrode 20, the conventional comb-shaped electrode array is classified as three types. FIGS. 2A to 2C are sectional diagrams showing the three types of the common electrode 16 and the pixel electrode 20 in the conventional comb-shaped electrode array. In the first type, as shown in FIG. 2A, the common electrode 16 and the pixel electrode 20 are patterned on the same plane and made of a transparent conductive material, such as ITO or IZO. In the second type, as shown in FIG. 2B, the common electrode 16 made of a non-transparent conductive material, such as Al and MoW, is patterned on the lower glass substrate 10 and followed by depositing the insulating layer 18. The pixel electrode 20 made of a transparent conductive material, such as ITO or IZO, is then patterned on the insulating layer 18. In the third type, as shown in FIG. 2C, the common electrode 16 and the pixel electrode 20 are patterned on the same plane and made of a non-transparent conductive material, such as Al and MoW. In practice, however, the asymmetrical electrode structure of the IPS-LCD generates image sticking and flicker problems in IPS-LCD, typically referred to the flexoelectric effect.

SUMMARY OF THE INVENTION

To solve the above problems, the present invention provides a display device with compensating electrodes. A liquid crystal layer is interposed between an array substrate and a color filter substrate. A pixel formed by a plurality of compensating electrodes is disposed on an array substrate and the pixel comprises a plurality of first electrodes and second electrodes. A insulating layer is disposed between the first electrode and the second electrode. Each pixel includes a first sub-pixel, a second sub-pixel and a third sub-pixel. The first sub-pixel includes a first and a second domain. The second sub-pixel, which is adjacent to the first sub-pixel, includes a third and a fourth domain. The third sub-pixel, which is adjacent to the first sub-pixel, includes a fifth and a sixth domain.

The first electrodes and the second electrodes are parallel to each other in each domain. The first electrodes are disposed below the second electrodes in the first, fourth and fifth domains. The first electrodes are disposed over the second electrodes in the second, third and sixth domains.

Due to the cause of the position of the reversed first electrodes and the second electrodes in the domain and in adjacent domains, a compensating effect is generated, eliminating the Flexoelectric effect produced by internal DC potential.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1A is a cross section of a conventional IPS-LCD, and the liquid crystal molecule arrangement thereof when LCD is powered off;

FIG. 1B is a cross section of a conventional IPS-LCD, and the liquid crystal molecule arrangement thereof when LCD is powered on;

DETAILED DESCRIPTION OF THE INVENTION

First Embodiment

Figures 1A, 1B:
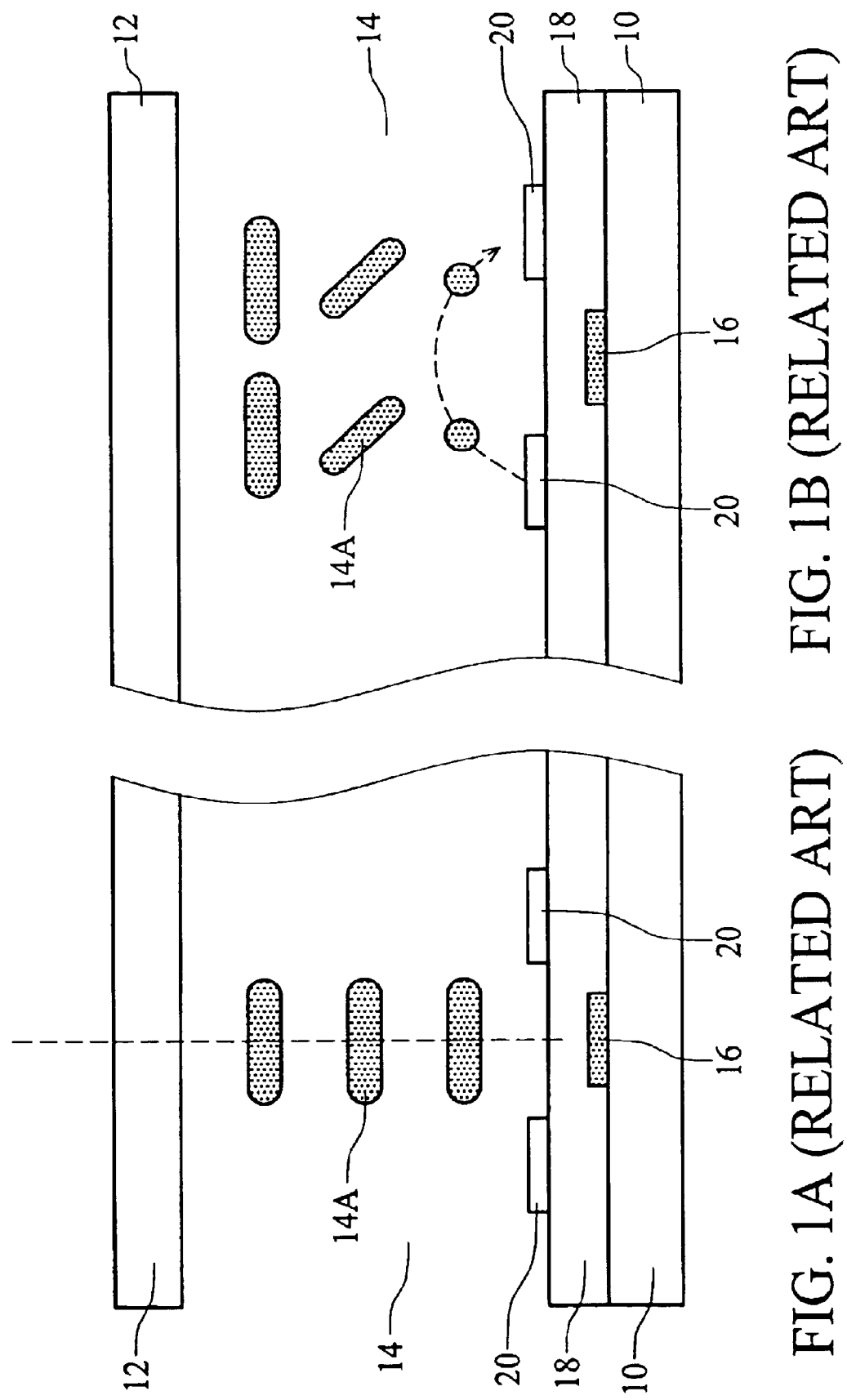
Figure 1C:
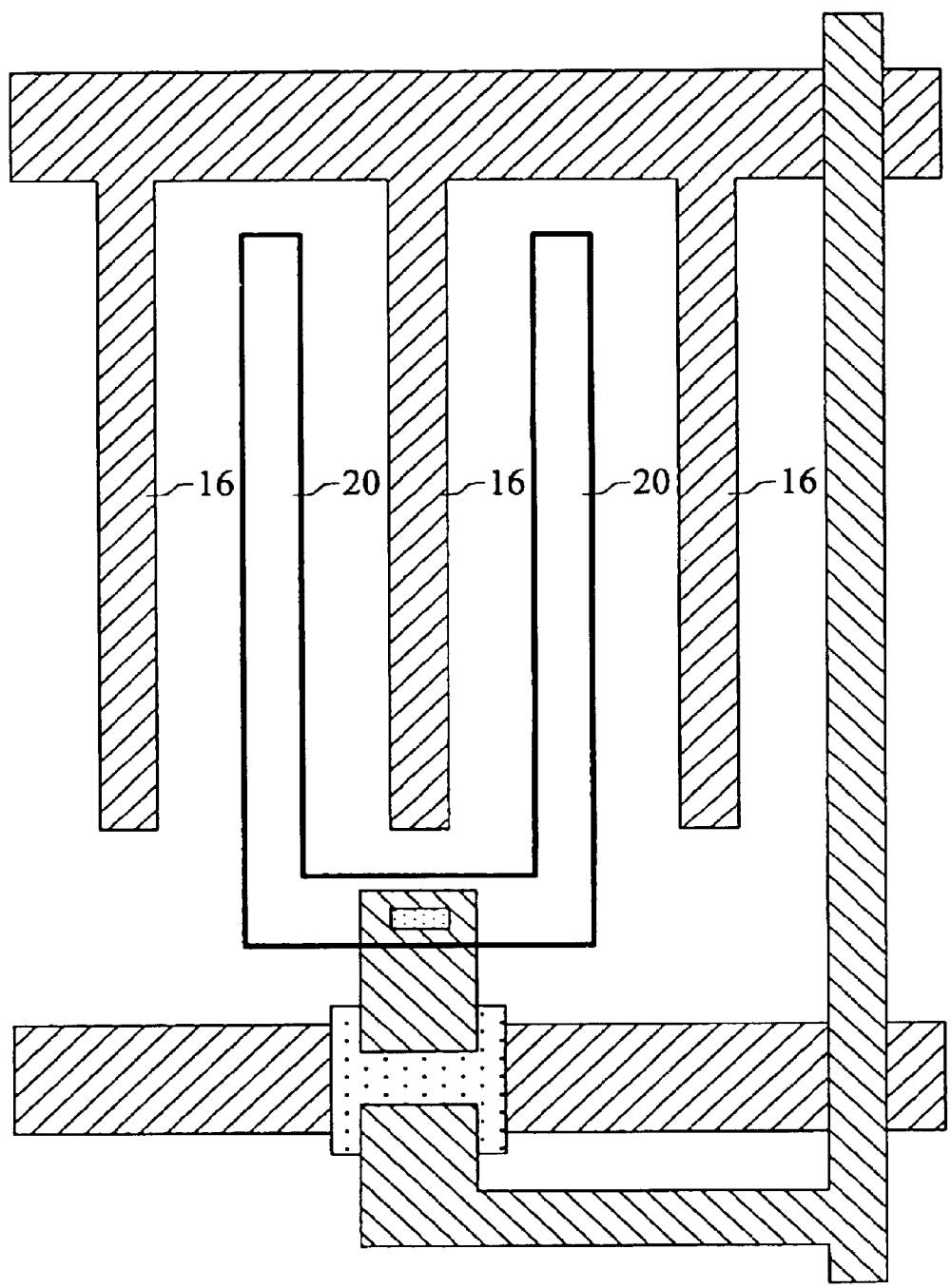
FIG. 1C is a top view of electrode structures of conventional IPS-LCD.
Figure 2A:
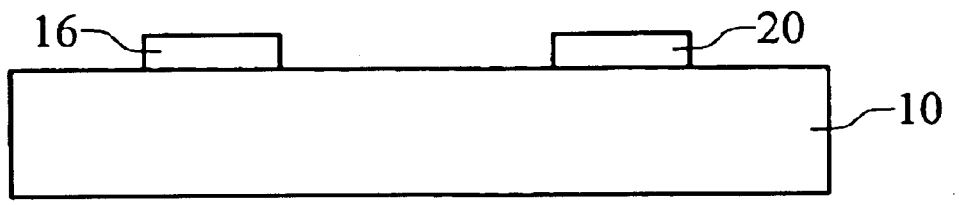
FIGS. 2A to 2C are cross sections of a part of a conventional IPS-LCD.
Figure 2B:
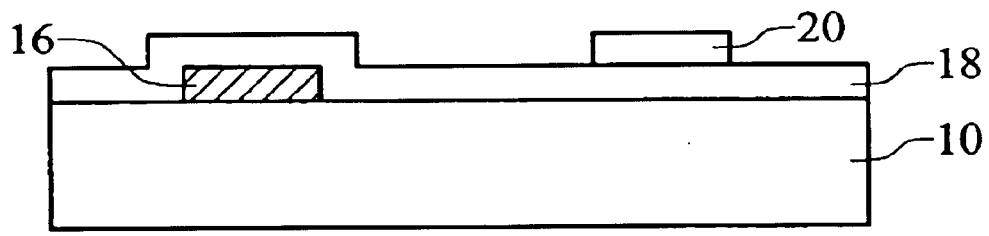
Figure 2C:
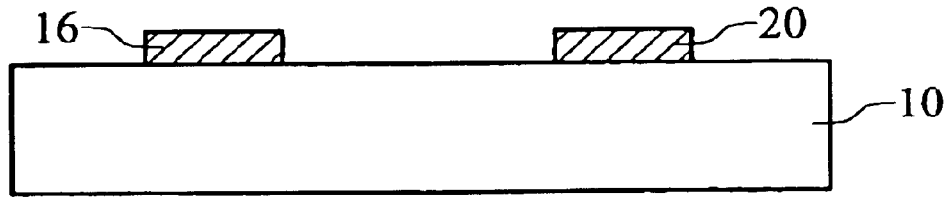
Figure 3A:
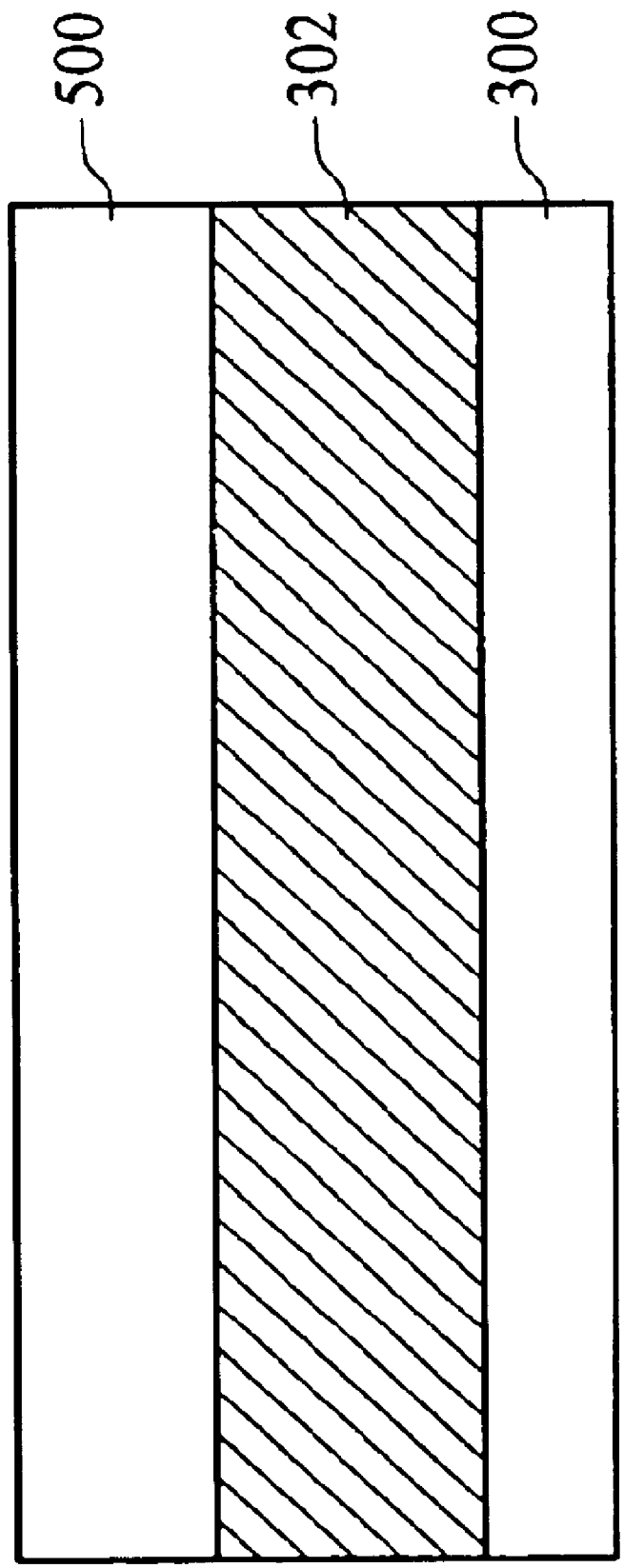
FIG. 3A is a cross section of the IPS-LCD of the present invention.

As shown in FIG. 3A, in the display device of the present invention, a liquid crystal layer 302 is interposed between an array substrate 300 and a color filter substrate 500.

Figure 3B:
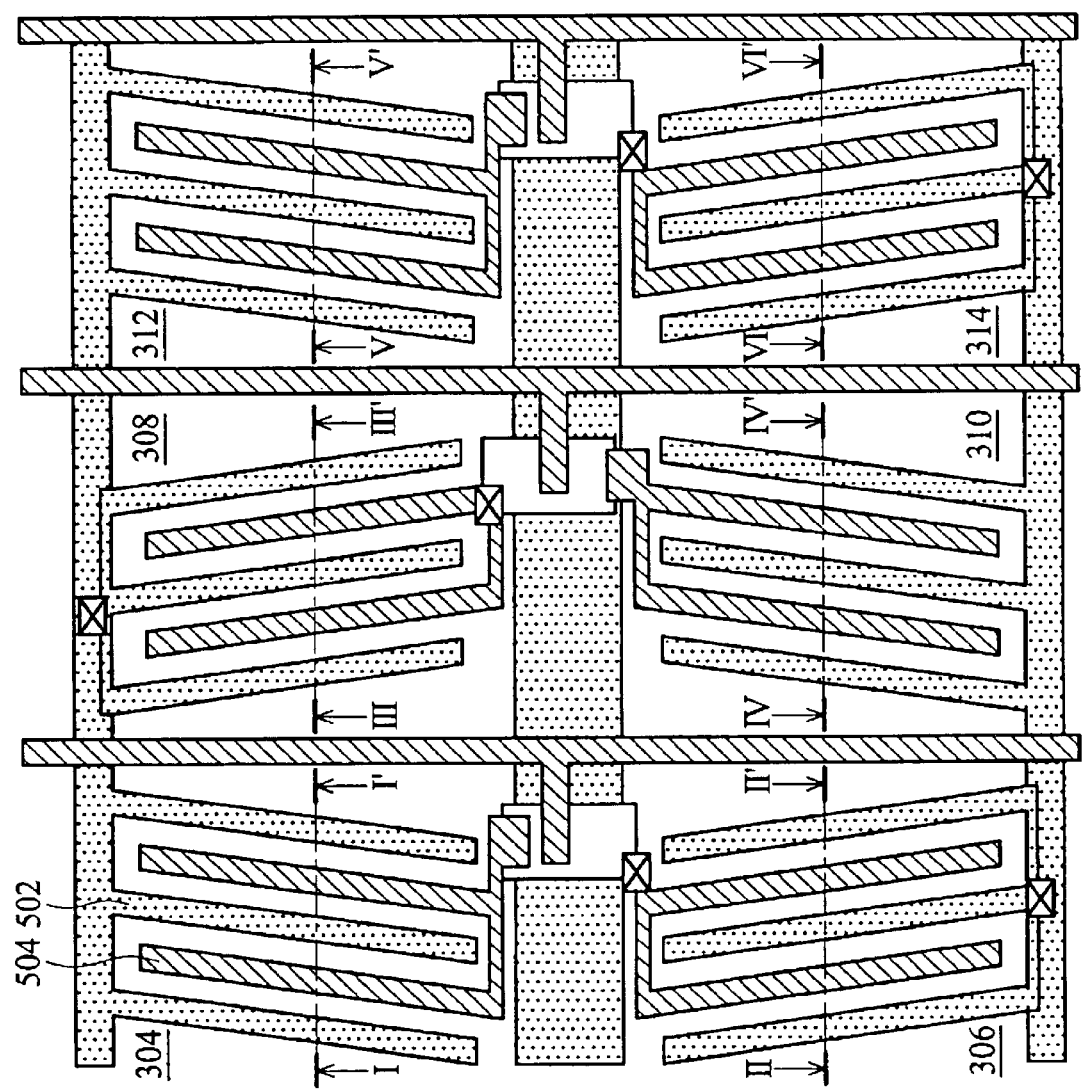
FIG. 3B is a top view of the IPS-LCD of the first embodiment of the present invention.

Referring to FIG. 3B, a pixel formed of a plurality of compensating electrodes is disposed on an array substrate and the pixel comprises a plurality of first electrodes 502 and second electrodes 504. A insulating layer is disposed between the first electrode 502 and the second electrode 504. Each pixel includes a first sub-pixel, a second sub-pixel and a third sub-pixel. The first sub-pixel, second sub-pixel and third sub-pixel respectively includes a first domain 304 and a second domain 306, a third domain 308 and a fourth domain 310, and a fifth and a sixth domain 312,314. The second sub-pixel is adjacent to the first sub-pixel. The third sub-pixel is adjacent to the second sub-pixel.

The third domain 308 is adjacent to the first domain 304, the fourth domain 310 and the fifth domain 312. The third domain 308, the second domain 306 and the sixth domain 314 are diagonal. The fourth domain 310 is adjacent the second domain 306, third domain 308 and the sixth domain 314. The fourth domain 310, the first domain 304 and the fifth domain 312 are diagonal. The first electrodes 502 and the second electrodes 504 are parallel to each other in each domain. The first electrodes 502 are disposed below the second electrodes 504 in the first, fourth and fifth domains 304,310,312. The first electrodes 502 are disposed over the second electrodes 504 in the second, third and sixth domains 306,308,314.

The first electrodes 502 are formed of non-transparent materials, such as Al or MoW. The second electrodes 504 are formed of transparent materials, such ITO or IZO. Both the first electrodes 502 and the second electrodes 504 can be comb type electrodes.

Figure 5A:
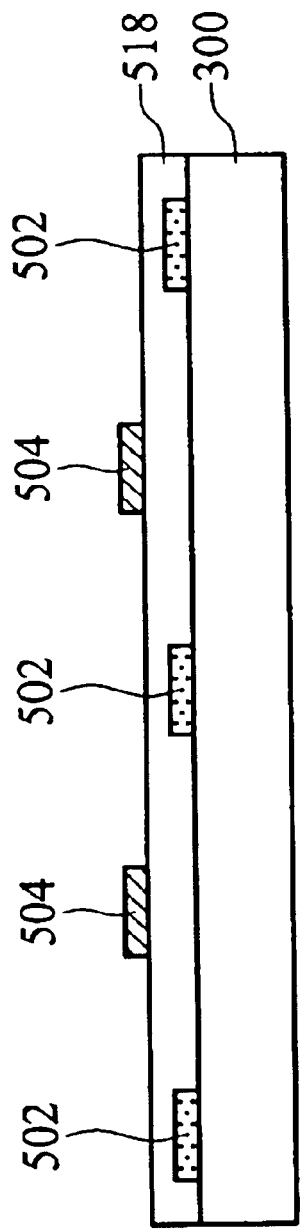
FIG. 5A is a cross section along lines I–I', IV–IV' and V–V' in FIG. 3B, and along lines I–I', IV–IV' in FIG. 4A, FIG. 4B and FIG. 4C.

FIG. 5A is cross section along lines I–I', IV–IV' and V–V' in FIG. 3B. As shown in FIG. 5A, the second electrodes 504 are over the first electrodes 502, and the first electrodes 502 and the second electrodes 504 are intersecting with each other. A insulating layer 518 is formed between the first electrodes 502 and the second electrodes 504.

Figure 5B:
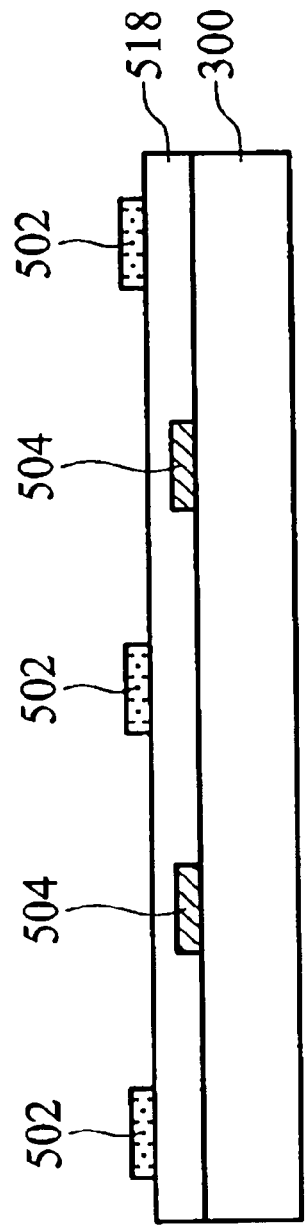
FIG. 5B is a cross section along lines II–II', III–III' and VI–VI', in FIG. 3B, and along lines II–II', III–III' in FIG. 4A, FIG. 4B and FIG. 4C.

FIG. 5B is cross section along lines II–II', III–III' and VI–VI' in FIG. 3B. As shown in FIG. 5B, the second electrodes 504 are below the first electrodes 502, and the first electrodes 502 and the second electrodes 504 are intersecting with each other. A insulating layer 518 is formed between the first electrodes 502 and the second electrodes 504.

Consequently, due to the reversed position of the first and the second electrodes 502,504 in the domain and in the adjacent domain, a compensating effect is generated, eliminating the flexoelectric effect produced by internal DC potential. Moreover, the described pixel electrode structure is applicable to large size LCDs for large size LCDs can be allowanced by the muti-domain pixels of the present invention.

Second Embodiment

Figure 4A:
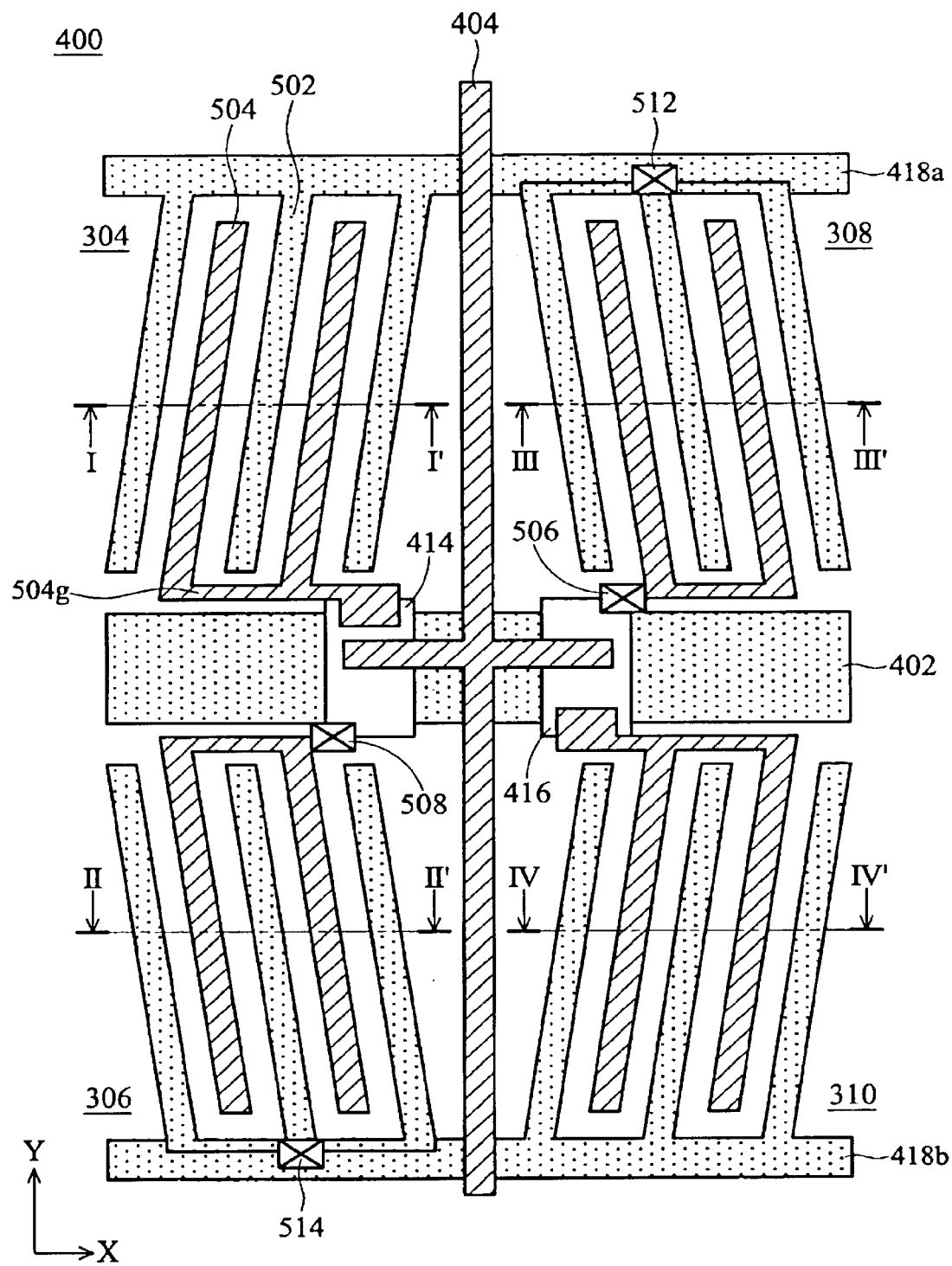
FIG. 4A is a top view of the IPS-LCD of the second embodiment of the present invention.

Referring to FIG. 4A, a plurality of array area are defined on the inner surface of a array substrate. The array substrate is referred to as the TFT (Thin Film Transistor) substrate. The array area is divided by a gate line 402 along the first direction(X direction) and a first data line 404 along the second direction(Y direction), defining a first domain 304, a second domain 306, a third domain 308 and a fourth domain 310, arranged in matrix type. A first thin film transistor 414 and a second thin film transistor 416 are formed on the gate line 402. The first TFT 414 is formed on the left side of first data line 404, and the second TFT 416 is formed on the right side thereof. The combination of the first domain 304, the second domain 306, the third domain 308 and the fourth domain 310 can be a pixel or a sub-pixel.

The first domain 304 and the second domain 306 are parallel in the same row. The third and the fourth domains 308,310 are in the same column. The first and the third domains 304,308 are in the same row. The second and the fourth domains 306,310 are in the same raw.

The first electrodes 502 in the first domain 304 and the fourth domain 310 include the first and second common lines 418a,418b along the first direction(X direction), and three branches of the first and second common lines 418a, 418b along the third direction, wherein the third direction is the direction of the clock-wise rotation from Y direction at an angle between 5° to 15°.

The first electrodes 502 in the second and the third domains 306,308 include a plurality of branches along the fourth direction, wherein fourth direction is the direction of the counter clock-wise rotation from Y direction at an angle between 5° to 15°.

The second electrodes 504 in the first and fourth domains 304,310 each includes a comb stem 504g near the gate line 402, and a plurality of branches along the third direction from the comb stem 504g. The second electrodes 504 in the second and third domains 306,308 include a plurality of branches along the fourth direction.

In the current embodiment, the angle between the third and first direction can differ from the angel between the fourth and first direction. The two angels, however, are preferably reversed with the same magnitudes. The second electrodes 504 in the second domain 306 are connected to the first TFT 414 through the first contact hole 508. The second electrodes 504 in the third domain 308 are connected to the second TFT 416 through the second contact hole 506. The first electrodes 502 in the third domain 308 are connected to the first common line 418a through the third contact hole 512. The first electrodes 502 in the second domain 306 are connected to the second common line 418b through the fourth contact hole 514.

Third Embodiment

Figure 4B:
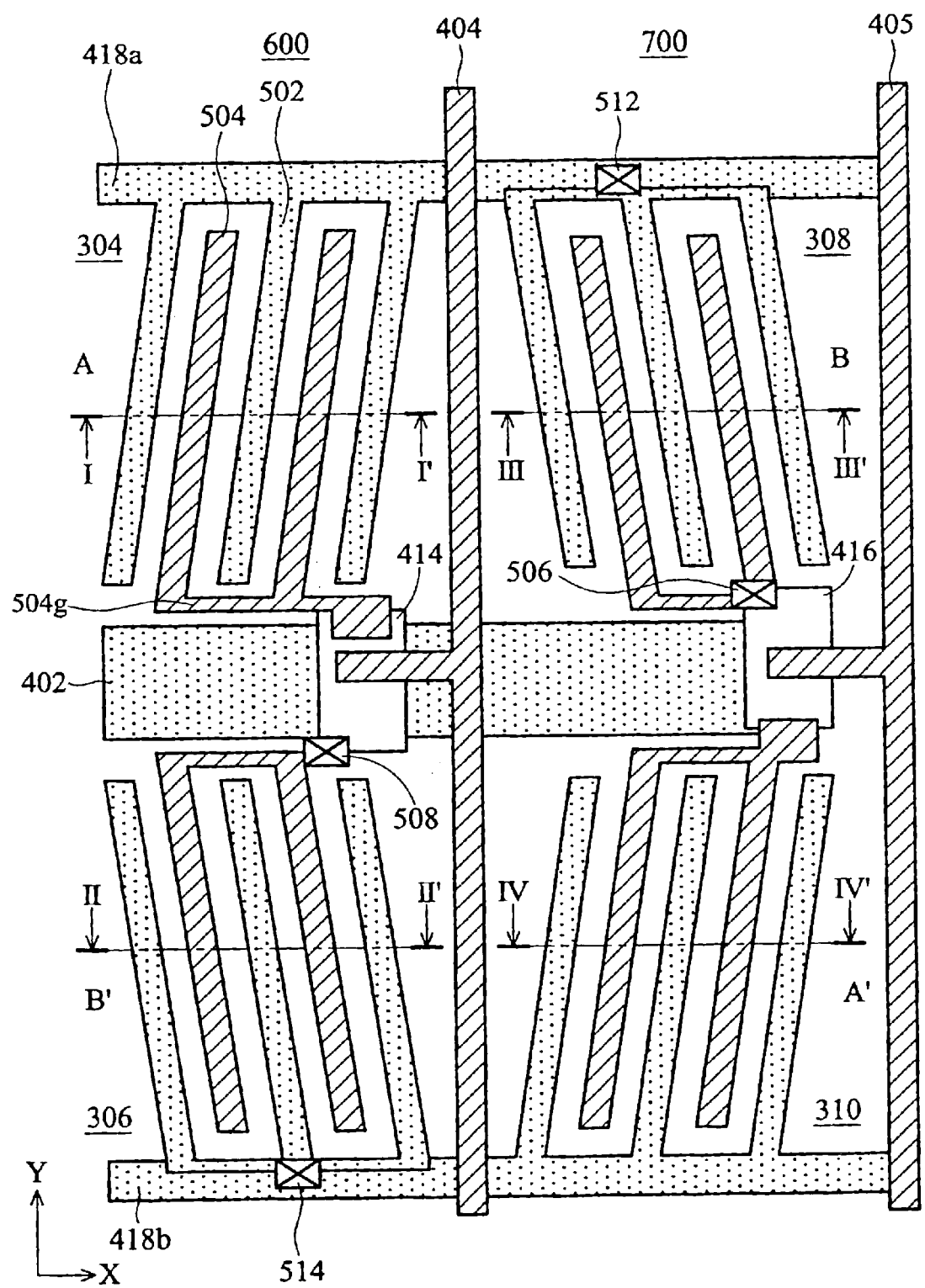
FIG. 4B is a top view of the IPS-LCD of the third embodiment of the present invention.

Referring to FIG. 4B, a plurality of array areas 600,700 are defined on the inner surface of an array substrate. The array areas are divided by a gate line 402 along the first direction(X direction) and first and second data lines 404, 405 along the second direction(Y direction), defining a first domain 304, a second domain 306, a third domain 308 and a fourth domain 310, arranged in a matrix. A first thin film transistor 414 and a second thin film transistor 416 are formed on the gate line 402, wherein the first TFT 414 is disposed on the left side of the first data line 404, and the second TFT 416 on the left side of the second data line 405. The combination of the first and second domains 304,306 can be a first sub-pixel. The combination of the third and the fourth domains 308,310 can be a second sub-pixel.

Fourth Embodiment

Figure 4C:
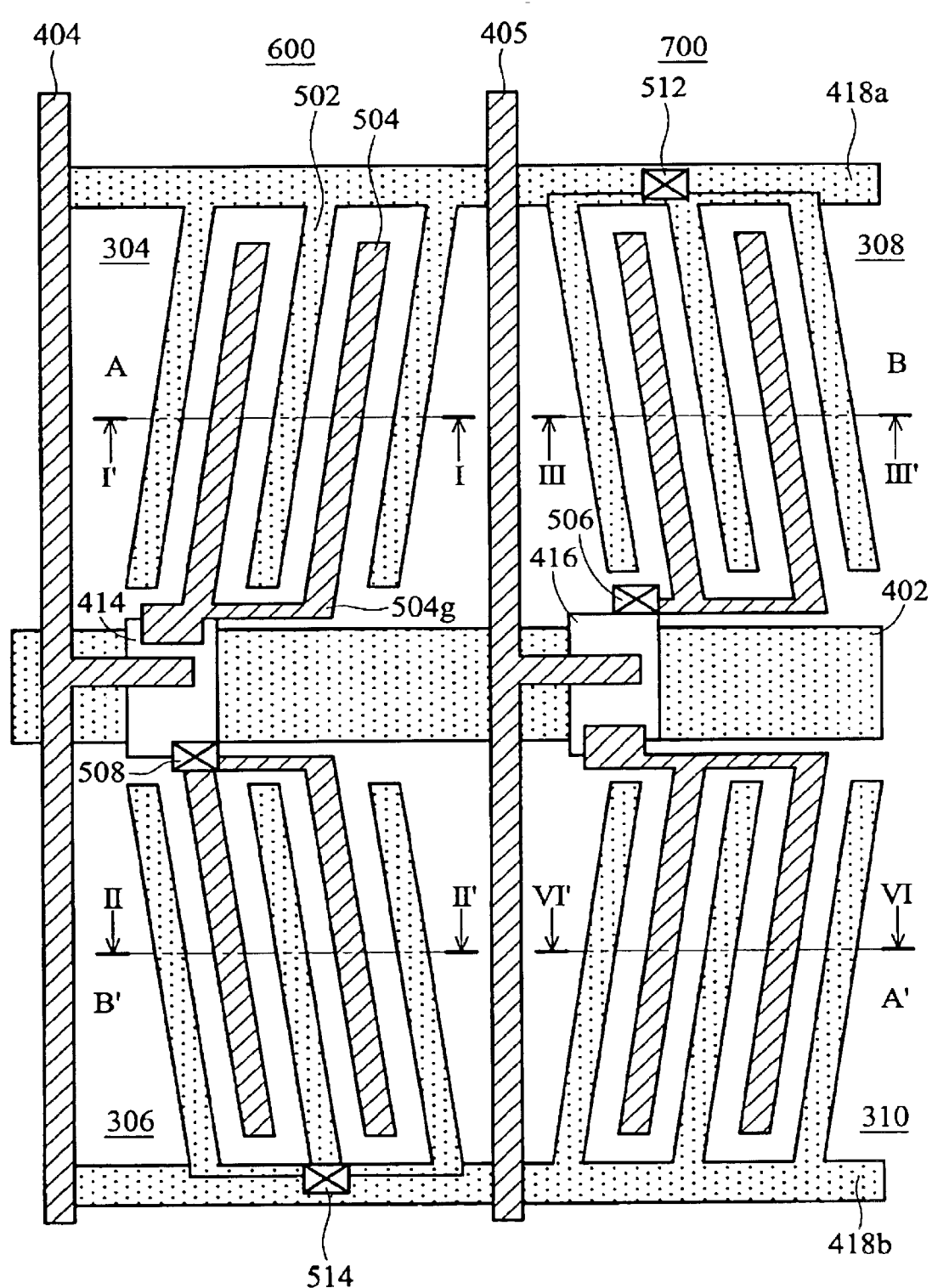
FIG. 4C is a top view of the IPS-LCD of the fourth embodiment of the present invention.

Referring to FIG. 4C, a plurality of array areas 600,700 are defined on the inner surface of an array substrate. The array areas are divided by a gate line 402 along the first direction(X direction) and first and second data lines 404, 405 along the second direction(Y direction), defining a first domain 304, a second domain 306, a third domain 308 and a fourth domain 310, arranged in a matrix. A first thin film transistor 414 and a second thin film transistor 416 are formed on the gate line 402, wherein the first TFT 414 is on the right side of the first data line 404, and the second TFT 416 on the right side of the second data line 405. The combination of the first and the second domains 304,306 can be a first sub-pixel. The combination of the third and the fourth domains 308,310 can be a second sub-pixel.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of thee appended claims should be accorded the broadest interpretation so as to encompass all such modifications and similar arrangements.

What is claimed is:

1. A display device structure with compensating electrodes, wherein the display device is composed of a first substrate, a second substrate and a liquid crystal layer formed therebetween, a pixel composed of a plurality of compensating electrodes is formed on the first substrate, the pixel is comprised of a plurality of first and second electrodes, a insulating layer is disposed between the first and the second electrodes, and each pixel comprising:

a first sub-pixel, wherein the first sub-pixel is divided into a first domain and a second domain;

a second sub-pixel, wherein the second sub-pixel is adjacent to the first sub-pixel and divided into a third domain and a fourth domain; and a third sub-pixel, wherein the third sub-pixel is adjacent to the second sub-pixel and divided into a fifth domain and a sixth domain;

wherein the first electrodes and the second electrodes are parallel to each other in each pixel, the first electrodes are below the second electrodes in the first, fourth and fifth domains, and the first electrodes are over the second electrodes in the second, third, and sixth domain.

2. The structure as claimed in claim 1, wherein the third domain is adjacent to the first, fourth, and fifth domains, and the third domain is diagonal to the second and the sixth domains.

3. The structure as claimed in claim 1, wherein the fourth domain is adjacent to the second, third, and sixth domains, and the fourth domain is diagonal to the first and the fifth domains.

4. The structure as claimed in claim 1, wherein the first electrodes are first comb type electrodes, and the second electrodes are second comb type electrodes.

5. The structure as claimed in claim 1, wherein the first electrodes are formed of non-transparent materials, and the non-transparent materials are Al or MoW.

6. The structure as claimed in claim 1, wherein the second electrodes are formed of transparent materials, and the transparent materials are ITO or IZO.

7. A display device structure with compensating electrodes, comprising:

a first substrate, wherein the first substrate includes a first, second, third, and fourth domains, arranged in a matrix, the first domain and the second domain are parallel in the same column, the third and the fourth domains are in the same column, the first and the third domains are in the same row, the second and the fourth domains are in the same row;

a gate line, wherein the gate line extends along a first direction on the first substrate;

a first data line, wherein the first data line extends along a second direction on the first substrate;

a plurality of TFTs, wherein the TFTs are disposed on the matrix and connected to the first data line and the gate line;

a plurality of first electrodes, wherein the first electrodes are respectively formed in the first, second, third and fourth domains, and a plurality of second electrodes, wherein the second electrodes are respectively formed in the first, second, third and fourth domains;

wherein the second electrodes are electrically connected to the TFTs;

wherein the first electrodes in the second and third domains are respectively electrically connected to the first electrodes in the fourth and first domains, wherein the positions of the first and second electrodes are the same in the diagonal domains, and the positions of the first and second electrodes are reversed in the adjacent domains.

8. The structure as claimed in claim 7, wherein the first direction is perpendicular to the second direction.

9. The structure as claimed in claim 7, wherein the TFTs include a first TFT and a second TFT.

10. The structure as claimed in claim 9, wherein the first TFT is on the left side of the intersection of the gate line and the first data line connecting the second electrodes in the first and the second domains, and the second TFT is on the right side of the intersection of the gate line and the first data line connecting the second electrodes in the third and the fourth domains.

11. The structure as claimed in claim 9, further comprising a second data line extending along the second direction on the first substrate.

12. The structure as claimed in claim 11, wherein the first TFT is on the left side of the intersection of the gate line and the first data line connecting the second electrodes in the first and the second domains, and the second TFT is on the left side of the intersection of the gate line and the second data line connecting the second electrodes in the third and the fourth domains.

13. The structure as claimed in claim 11, wherein the first TFT is on the right side of the intersection of the gate line and the first data line connecting the second electrodes in the first and the second domains, and the second TFT is on the right side of the intersect point of the gate line and the second data line connecting the second electrodes in the third and the fourth domains.

14. The structure as claimed in claim 9, wherein the first electrodes in the first domain include a first common line extending along the first direction, the first electrodes in the fourth domain include a second common line extending along the first direction, the first electrodes in the first domain are connected to the first electrodes in the third domain through the first common line, and the first electrodes in the fourth domain are connected to the first electrodes in the second domain through the second common line.

15. The structure as claimed in claim 14, wherein the second electrodes in the second domain are connected to the first TFT through a first contact hole, and the second electrodes in the third domain are connected to the second TFT through a second contact hole.

16. The structure as claimed in claim 14, wherein the first electrodes in the third domain are connected to the first common line through a third contact hole, and the first electrodes in the second domain are connected to the second common line through a fourth contact hole.

17. The structure as claimed in claim 7, wherein the first electrodes are first comb type electrodes, and the second electrodes are second comb type electrodes.

18. The structure as claimed in claim 17, wherein the first comb type electrodes in the first and fourth domains include a plurality of branches extending along a third direction;

the first comb type electrodes in the second and third domains include a plurality of branches extending along a fourth direction;

the second comp type electrodes in the first domain include a first comb stem near the gate line and a plurality of branches extending along the third direction from the first comb stem;

the second comp type electrodes in the second domain include a second comb stem near the gate line and a plurality of branches extending along the fourth direction from the second comb stem;

the second comp type electrodes in the third domain include a third comb stem near the gate line and a plurality of branches extending along the fourth direction from the third comb stem;

the second comp type electrodes in the fourth domain include a fourth comb stem near the gate line and a plurality of branches extending along the third direction from the fourth comb stem; and the first comb type electrodes and the second comb type electrodes are intersecting with each other.

19. The structure as claimed in claim 17, wherein the third direction is the direction of clock-wise rotation from the second direction at an angle between 5° to 15°.

20. The structure as claimed in claim 17, wherein the fourth direction is the direction of counter clock-wise rotation from the second direction at an angle between 5° to 15°.

* * * * *